United States Patent
Yang et al.

(10) Patent No.: US 12,219,258 B2
(45) Date of Patent: Feb. 4, 2025

(54) ANTI-SHAKE ASSEMBLY AND MANUFACTURING METHOD THEREFOR, CAMERA MODULE WITH THE ANTI-SHAKE ASSEMBLY

(71) Applicants: Avary Holding (Shenzhen) Co., Limited., Shenzhen (CN); QING DING PRECISION ELECTRONICS (HUAIAN) CO., LTD, Huai an (CN)

(72) Inventors: Cheng-Yi Yang, Shenzhen (CN); Qiang Song, Shenzhen (CN); Yan-Qiong He, Shenzhen (CN); Yao-Cai Li, Shenzhen (CN); Biao Li, Shenzhen (CN); Zu-Ai Li, Shenzhen (CN); Mei-Hua Huang, Shenzhen (CN)

(73) Assignees: Avary Holding (Shenzhen) Co., Limited., Shenzhen (CN); QING DING PRECISION ELECTRONICS (HUAIAN) CO., LTD, Huai an (CN)

( * ) Notice: Subject to any disclaimer, the term of this patent is extended or adjusted under 35 U.S.C. 154(b) by 86 days.

(21) Appl. No.: 18/094,518

(22) Filed: Jan. 9, 2023

(65) Prior Publication Data

US 2023/0164441 A1    May 25, 2023

Related U.S. Application Data

(63) Continuation-in-part of application No. PCT/CN2021/102920, filed on Jun. 29, 2021.

(51) Int. Cl.
*H04N 23/68*    (2023.01)
*G02B 27/64*    (2006.01)
*H02K 41/035*    (2006.01)

(52) U.S. Cl.
CPC ......... *H04N 23/687* (2023.01); *G02B 27/646* (2013.01); *H02K 41/0356* (2013.01)

(58) Field of Classification Search
CPC ............................ H04N 23/687; G02B 27/646
USPC ......................................................... 348/208.5
See application file for complete search history.

(56) References Cited

U.S. PATENT DOCUMENTS 11,622,064 B2 *   4/2023   Park .................... H04N 23/687
                                                             348/208.7

FOREIGN PATENT DOCUMENTS

TW          200622465 A        7/2006
TW          202105035 A        2/2021

* cited by examiner

*Primary Examiner* — Joel W Fosselman
(74) *Attorney, Agent, or Firm* — ScienBiziP, P.C.

(57) ABSTRACT

An anti-shake assembly with reduced size is disclosed which includes a circuit board, a photosensitive chip, and a magnetic component. The circuit board includes a first rigid board, a second rigid board, a plurality of connectors, and a plurality of coils. The first rigid board has a housing space. The second rigid board is movably housed in the housing space. The connectors are flexibly connected between the first rigid board and the second rigid board. The photosensitive chip and the coils are provided on the second rigid board. The magnetic component includes a base and a plurality of magnets. The base includes a central plate and a side plate. The side plate is arranged around a periphery of the central plate to form a housing space. The magnets are provided on the central plate facing the housing space. The magnets are arranged opposite to the coils.

17 Claims, 23 Drawing Sheets

ANTI-SHAKE ASSEMBLY AND MANUFACTURING METHOD THEREFOR, CAMERA MODULE WITH THE ANTI-SHAKE ASSEMBLY

FIELD

The subject matter herein generally relates to camera module, especially to an anti-shake assembly with reduced size and manufacturing method therefore, and a camera module with the anti-shake assembly.

BACKGROUND

In general, a voice coil motor is required to be installed in a camera module to achieve anti-shake function of the camera module by timely adjusting the posture of the optical lens.

With various image capturing functions, electronic products such as mobile phones need to be equipped with many optical lenses, and a voice coil motor with higher power to adjust the positioned of multiple optical lenses. However, a high-power voice coil motor often requires more coil winding and a larger magnet, which is not conducive to the miniaturization requirement of the camera module.

BRIEF DESCRIPTION OF THE DRAWINGS

Implementations of the present technology will now be described, by way of example only, with reference to the attached FIGS.

DETAILED DESCRIPTION

Figure 1:
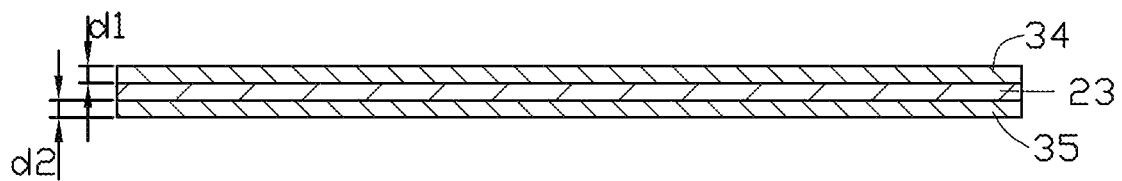
FIG. 1 is a diagrammatic view of a copper-clad substrate according to a first embodiment of the present application.

It will be appreciated that for simplicity and clarity of illustration, where appropriate, reference numerals have been repeated among the different FIGS. to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 12:
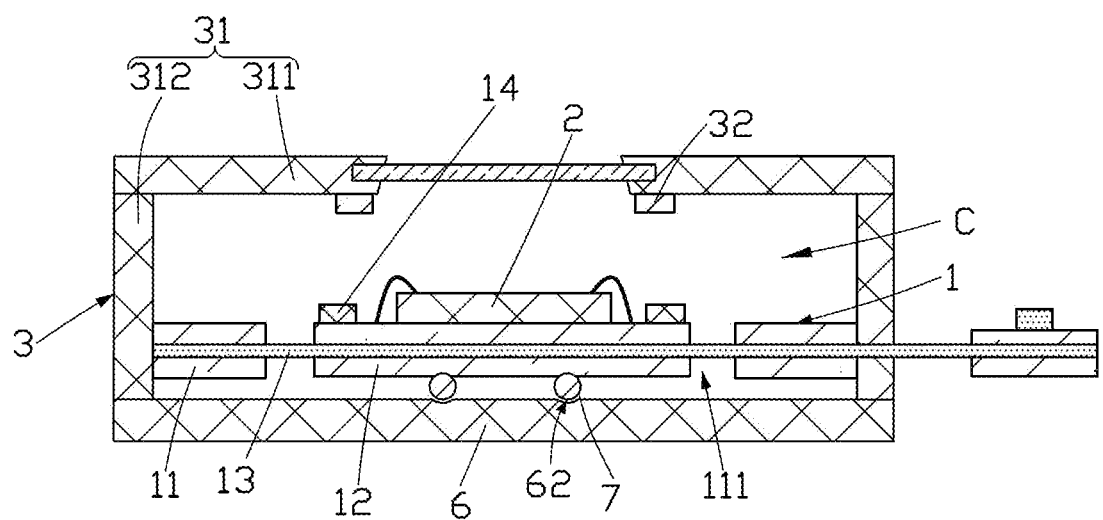
FIG. 12 is a diagrammatic view of an anti-shake assembly of the first embodiment of the present application.

Referring to FIG. 12, a first embodiment of the present disclosure provides an anti-shake assembly 10. The anti-shake assembly 10 includes a circuit board 1, a photosensitive chip 2, and a magnetic member 3. The circuit board 1 includes a first rigid board 11, a second rigid board 12, a plurality of flexible boards 13, and a plurality of coils 14. The first rigid board 11 defines a first accommodating space 111 therethrough, and the second rigid board 12 is disposed within the first accommodating space 111. The flexible boards 13 are flexibly connected between the first rigid board 11 and the second rigid board 12. The photosensitive chip 2 and the coils 14 are disposed on one side of the second rigid board 12. The magnetic member 3 includes a base 31 and a plurality of magnets 32. The base 31 includes a central plate 311 and two side plates 312, and the side plates 312 are arranged around at a periphery of the central plate 311 to form a receiving space C. The magnets 32 are disposed on one side of the central plate 311 facing the receiving space C. The second rigid board 12 is received in the receiving space C. The magnets 32 corresponds to the coils 14 one by one.

Figure 13:
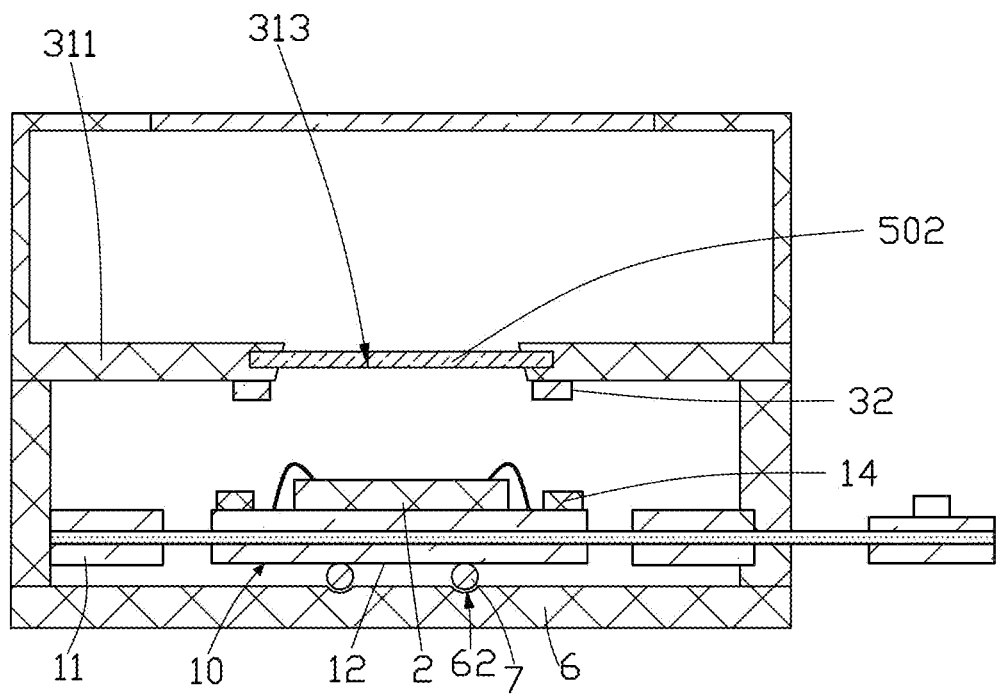
FIG. 13 is a view of a camera module of the first embodiment of the present application.

Referring to FIGS. 12 and 13, when in use, if the photosensitive chip 2 is in a normal position (the normal position refers to the photosensitive chip 2 facing the lens assembly 501), the second rigid board 12 will provide power to all the coils 14, and each powered coil 14 is subjected to a Lorentz force (not shown) in the magnetic field of the magnet 32. The Lorentz forces acting on the coils 14 mutually cancel each other, and the second rigid board 12 is in a balanced stationary state under the traction of the flexible boards 13.

If the photosensitive chip 2 is in an inclined position (the inclined position refers to the photosensitive chip 2 misaligned from the lens assembly 501), the second rigid board 12 will provide power to some of the coils 14, and some powered coils 14 are subjected to an unbalanced Lorentz force in the magnetic field of the magnet 32. This unbalanced Lorentz force can drive the second rigid board 12 to move within the plane of the first rigid board 11 to compensate for the inclination of the photosensitive chip 2, so that the photosensitive chip 2 is in a normal position again.

With the above configuration, the coils 14 can generate Lorentz force that drive the rigid board 12 to move within a plane of the first rigid board 11, thereby adjusting the posture of the photosensitive chip 20 and achieving an anti-shake function. This is advantageous in reducing the size of a camera module without the need for a large-sized voice coil motor to adjust the posture of the lens assembly.

In this embodiment, the anti-shake assembly 10 also includes a gyroscope (not shown) and a control chip (not shown). The gyroscope is provided on the rigid board 12, and the control chip is provided on the first rigid board 11 or the rigid board 12. The gyroscope is electrically connected to the control chip, and the control chip is electrically connected to the coils 14. The gyroscope senses the posture information (e.g., normal attitude or inclined attitude) of the photosensitive chip 2, and the control chip controls the energization state of the coil 14 based on the posture information. In the energization state, the coil 14 is subjected to Lorentz force in the magnetic field, which adjusts the position of the rigid board 12 and consequently adjusts the attitude of the photosensitive chip 2.

Figure 11:
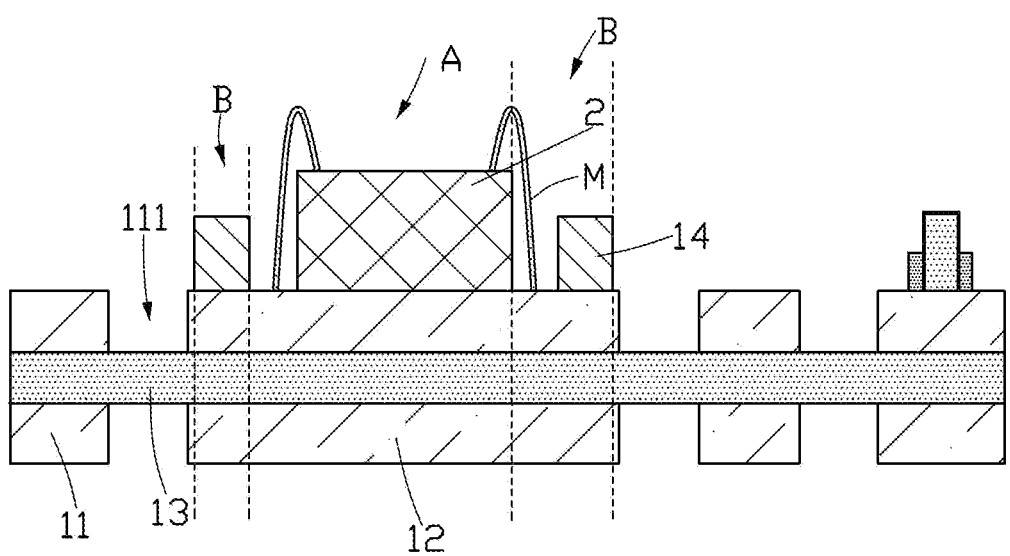
FIG. 11 is a sectional view of the circuit board shown in FIG. 10 along line X-X.

Refer to FIG. 11, in this embodiment, the second rigid board 12 is divided into a central region A and an edge region B surrounding the central region A. The photosensitive chip 2 is disposed in the central region A, and the coils 14 are symmetrically disposed in the edge region B.

Figure 10:
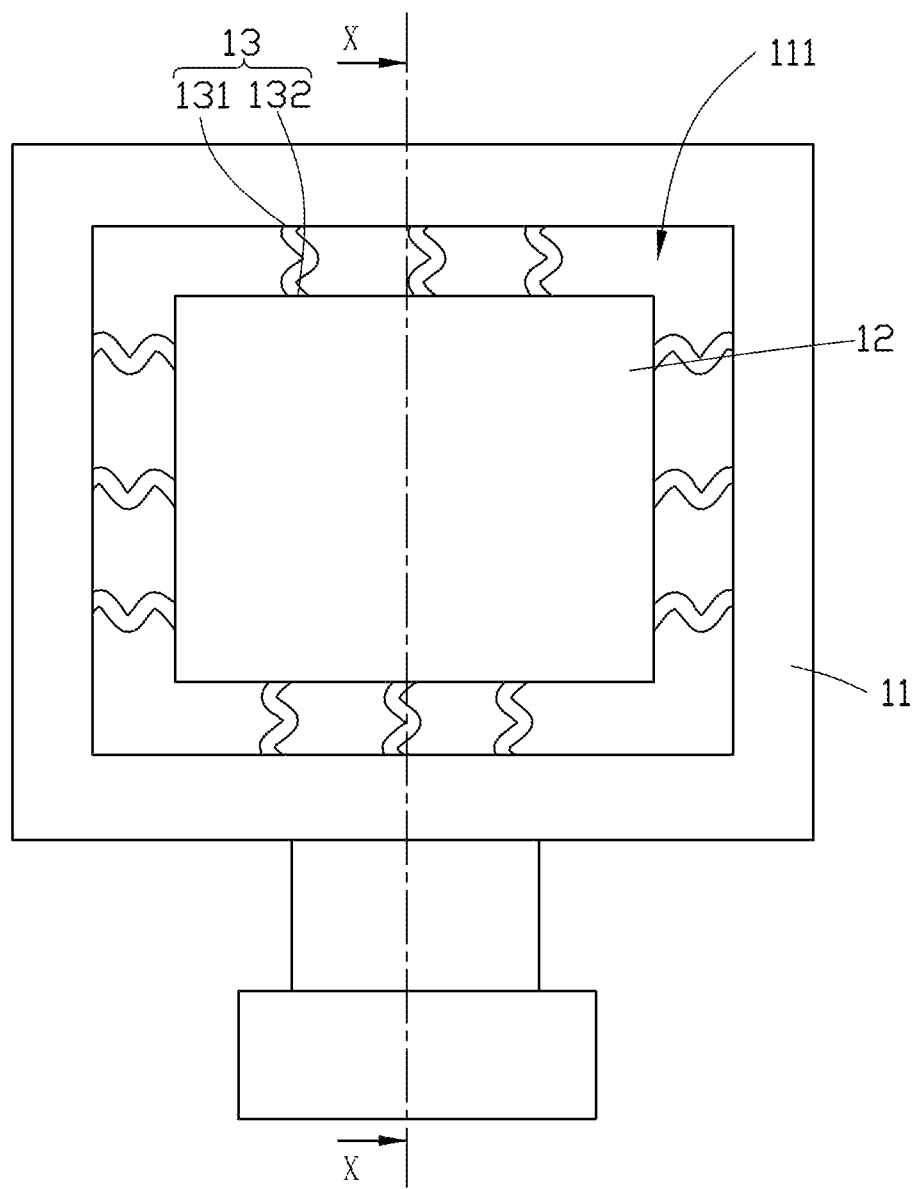
FIG. 10 is a diagrammatic view of a circuit board in the first embodiment of the present application.

Refer to FIG. 10, in this embodiment, the flexible boards 13 are approximately "S"-shaped and is able to resists deformation. The flexible boards 13 are symmetrically disposed around a periphery of the second rigid board 12 and include a first end 131 and a second end 132 opposite the first end 131. The first end 131 is electrically connected to the first rigid board 11, and the second end 132 is electrically connected to the second rigid board 12. In other embodiments, the flexible boards 13 can be replaced by other flexible connectors, such as connecting wire.

Refer to FIG. 12, in this embodiment, the anti-shake assembly 10 further includes a reinforcing plate 6 and a plurality of balls 7. The reinforcing plate 6 is spaced apart from a side of the second rigid board 12 opposite the photosensitive chip 2. The balls 7 are rollingly disposed between the reinforcement plate 6 and the second rigid board 12, facilitating movement of the second rigid board 12 on the reinforcing plate 6. The balls 7 support a portion weight of the second rigid board 12 and reduce friction between the second rigid board 12 and the reinforcing plate 6. Further, the reinforcing plate 6 has a plurality of first receptacles 62. Each ball 7 are partially received in a corresponding first receptacle 62 and is able to scroll in the first receptacle 62.

Figure 9:
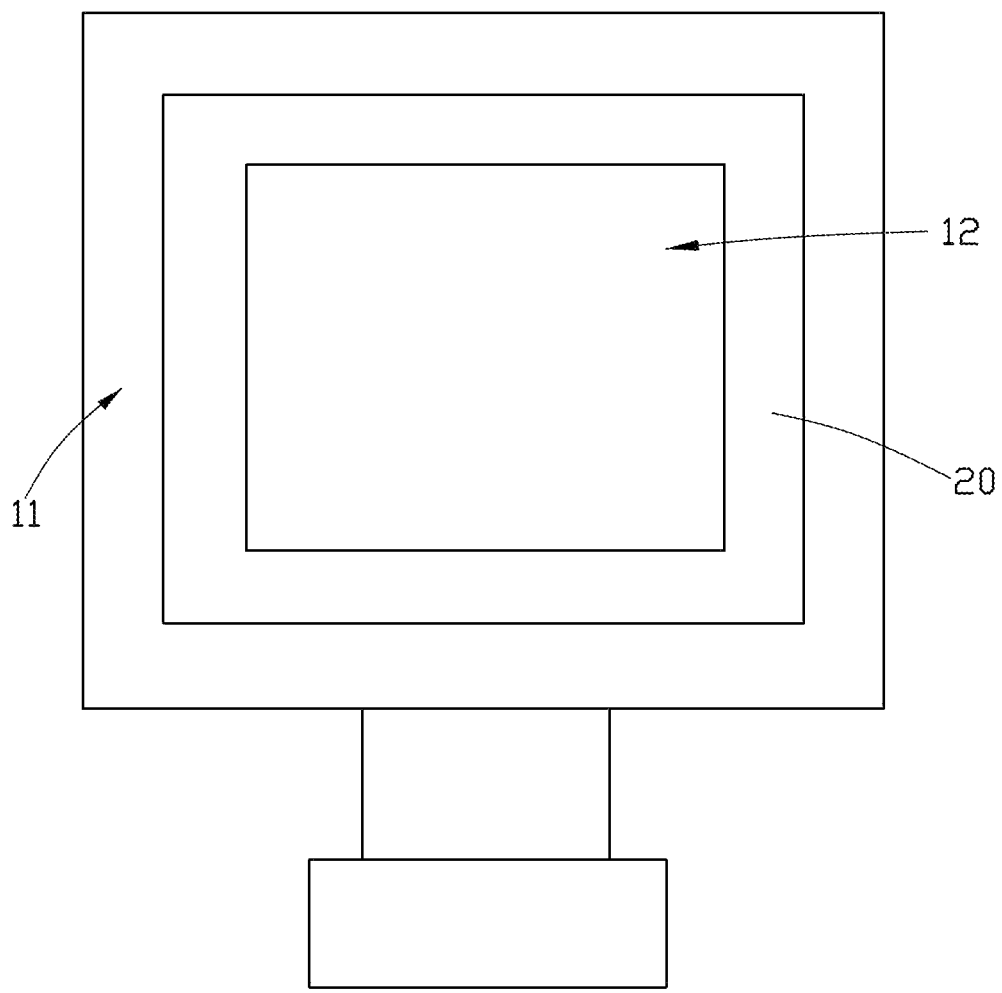
FIG. 9 is a top view of the second intermediate body shown in FIG. 8.

Referring to FIG. 1-11, a manufacturing method for the anti-shake assembly 10 of the first embodiment of the present disclosure is also provided. The manufacturing method includes the following steps:

S1: Refer to FIGS. 9 and 10, a circuit board 1 is provided. The circuit board 1 includes a first rigid board 11, a second rigid board 12, a plurality of flexible boards 13, and a plurality of coils 14. The first rigid board 11 is provided with a first accommodating space 111, and the second rigid board 12 is disposed in the first accommodating space 111. The flexible boards 13 are flexibly connected between the first rigid board 11 and the second rigid board 12, and the coils 14 are disposed on the second rigid board 12.

Figure 2:
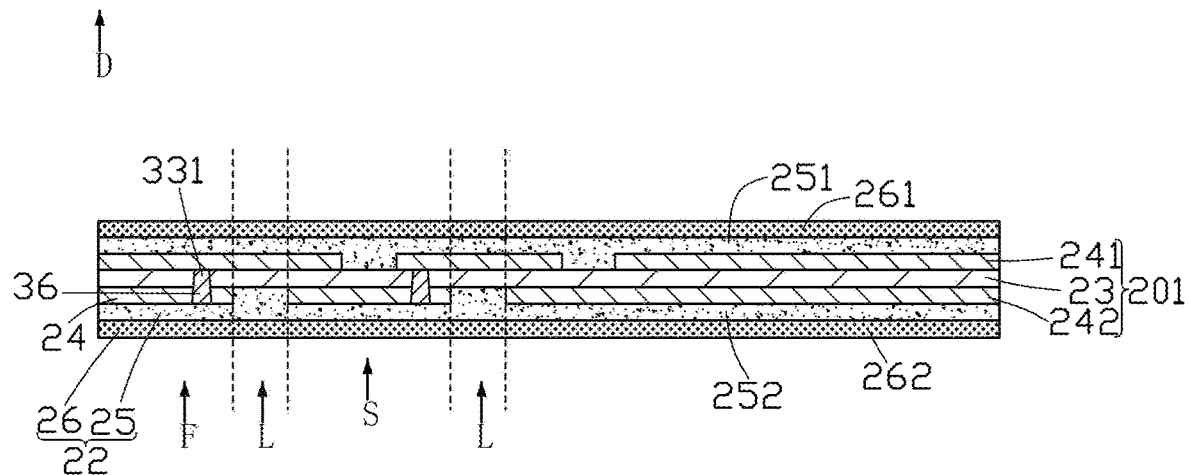
FIG. 2 is a diagrammatic view of an inner flexible board according to the first embodiment of the present application.

Refer to FIGS. 2-10, in this embodiment, the manufacturing method for the circuit board 1 includes:

S10: Refer to FIG. 2, providing an inner flexible board 20, which includes a core board 201 and cover films 22 disposed on opposite sides of the core board 201. The core board 201 includes an insulating layer 23 and inner circuit layers 24 disposed on opposite sides of the insulating layer 23. The cover films 22 include an adhesive layer 25 and a cover layer 26, and the adhesive layer 25 is disposed between the inner circuit layers 24 and the cover layer 26. In this embodiment, the materials of the insulating layer 23 and the cover layer 26 include Polyimide or Epoxy Resin. Along the thickness direction D of the inner flexible board 20, the inner flexible board 20 is divided into a first area F, a second area S, and a connecting area L. The first area F is disposed around the second area S, and the connecting area L connects the first area F and the second area S.

In this embodiment, refer to FIGS. 1 and 2, the method for manufacturing the inner flexible board 20 in step S10 includes:

S101: Refer to FIG. 1, a copper-clad substrate 33 is provided. The copper-clad substrate 33 includes the insulating layer 23, the first copper foil layer 34, and the second copper foil layer 35. The first copper foil layer 34 and the second copper foil layer 35 are arranged on opposite sides of the insulating layer 23. S101: Refer to FIG. 2, a first opening 36 is formed in the copper-clad substrate 33, the first opening 36 extends through the second copper foil layer 35 and the insulating layer 23. The bottom of the first copper foil layer 34 is exposed at the first opening 36.

S102: Refer to FIG. 2, a first conductor body 331 is electroplated within the first opening 36, the first conductor body 331 electrically conducts the first copper foil layer 34 and the second copper foil layer 35.

S103: Refer to FIG. 2, the first copper foil layer 34 is etched to form the first inner circuit layer 241, and the second copper foil layer 35 is etched to form the second inner circuit layer 242.

S104: Refer to FIG. 2, a first adhesive layer 251 is formed on the first inner circuit layer 241, and a second adhesive layer 252 is formed on the second inner circuit layer 242.

S105: Refer to FIG. 2, a first cover layer 261 is formed on the first adhesive layer 251, and a second cover layer 262 is formed on the second adhesive layer 252, to obtain the inner flexible board 20.

Figure 3:
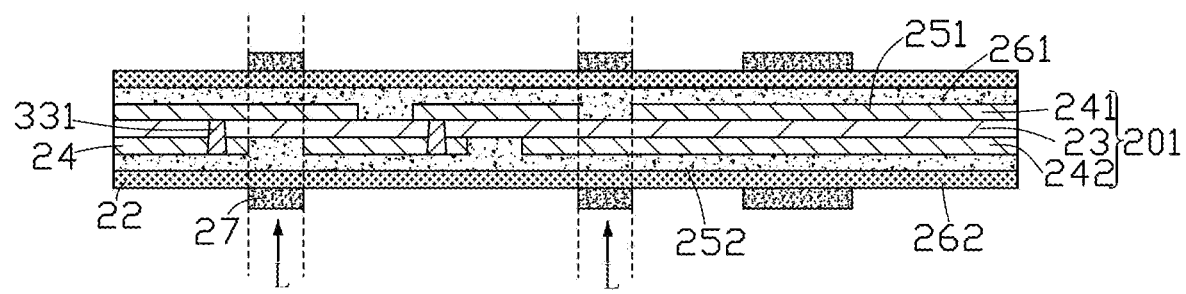
FIG. 3 is a diagrammatic view of the inner flexible board illustrated in FIG. 2 with a release film set.

S11: Refer to FIG. 3, a release film 27 is placed on the cover film 22 corresponding to the connecting region L of the flexible board 20.

Figure 4:
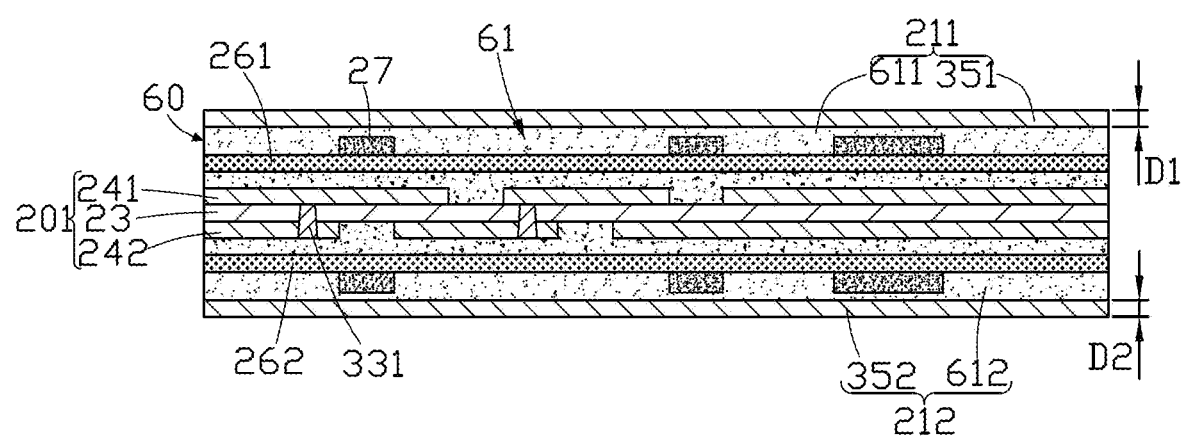
FIG. 4 is a diagrammatic view of a second intermediate body of the first embodiment of the present application.
Figure 5:
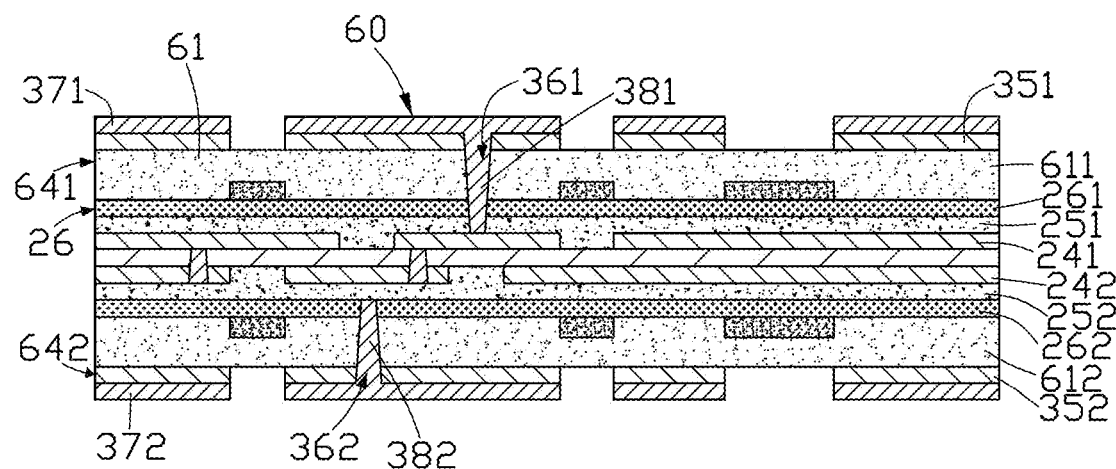
FIG. 5 is a diagrammatic view of the second intermediate body illustrated in FIG. 4 with an outer circuit layer set.
Figure 6:
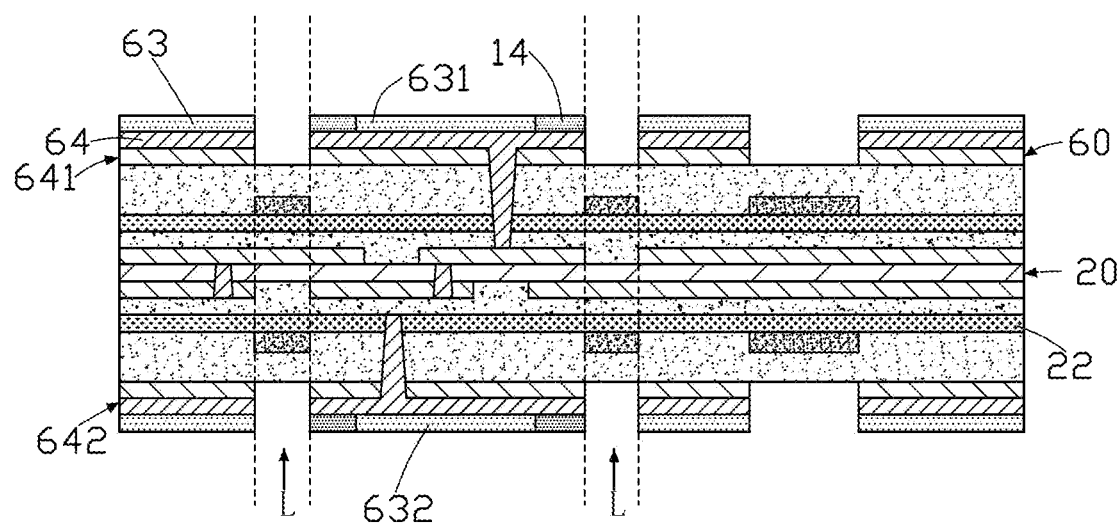
FIG. 6 is a diagrammatic view of the second intermediate body illustrated in FIG. 5 with a coil set.

S12: Refer to FIGS. 4, 5 and 6, an outer rigid board 60 is disposed on the inner flexible board 20. The outer rigid board 60 includes a substrate layer 61, an outer circuit layer 64, a plurality of the coils 14, and a soldering prevention layer 63. The substrate layer 61 is disposed between the outer circuit layer 64 and the covering layer 26, the coils 14 (refer to FIG. 6) are disposed on one side of the outer circuit layer 64 away from the substrate layer 61, and the soldering prevention layer 63 covers the outer circuit layer 64.

In this embodiment, the step S12 further includes:

S120: Refer to FIG. 4, a first outer rigid board 601 is pressed onto the first cover layer 261 and a second outer rigid board 602 is pressed onto the second cover layer 262 to obtain a second intermediate body 40. The first outer rigid board 601 includes a first base layer 611 and a third copper foil layer 351 disposed on the first base layer 611. The second outer rigid board 602 includes a second base layer 612 and a fourth copper foil layer 352 disposed on the second base layer 612. The thickness D1 of the third copper foil layer 351 or the thickness D2 of the fourth copper foil layer 352 is greater than the thickness d1 of the first copper foil layer 34 or the thickness d2 of the second copper foil layer 35 (refer to FIG. 1).

S121: Refer to FIG. 5, a second opening 361 and a third opening 362 are defined in the second intermediate body 40. The second opening 361 penetrates the third copper foil layer 351, the first base layer 611, the first cover layer 261, and the first adhesive layer 251 in sequence, and the bottom of the first inner circuit layer 241 is exposed at the bottom of the second opening 361. The third opening 362 penetrates the fourth copper foil layer 352, the second base layer 612, the second cover layer 262, and the second adhesive layer 252 in sequence, and the bottom of the second inner circuit layer 242 is exposed at the bottom of the third opening 362.

S122: Refer to FIG. 5, a first electroplating layer 371 is electroplated on the third copper foil layer 351 and a second electroplating layer 372 is electroplated on the fourth copper foil layer 352. Portion of the first electroplating layer 371 is filled into the second opening 361 to form a second conductor body 381, which is electrically connected to the third copper foil layer 351 and the first adhesive layer 251. Portion of the second electroplating layer 372 is filled into the third opening 362 to form a third conductor body 382, which is electrically connected to the fourth copper foil layer 352 and the second inner circuit layer 242.

S123: Refer to FIG. 5, the first electroplating layer 371 and the third copper foil layer 351 are etched to form a first outer circuit layer 641, and the second electroplating layer 372 and the fourth copper foil layer 352 are etched to form a second outer circuit layer 642.

S124: Refer to FIG. 6, a plurality of coils 14 is set on the first outer circuit layer 641.

S125: Refer to FIG. 6, a first soldering prevention layer 631 is disposed on the first outer circuit layer 641 and a second soldering prevention layer 632 is disposed on the second outer circuit layer 642.

Figure 7:
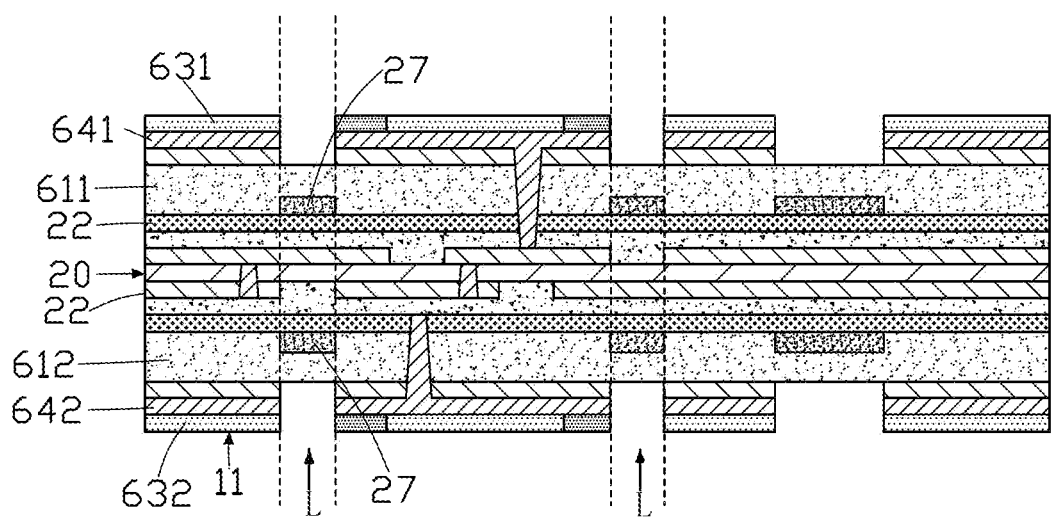
FIG. 7 is a diagrammatic view of the second intermediate body illustrated in FIG. 6, with a corresponding outer rigid board being cut.

S13: Refer to FIG. 7, a part of the outer rigid board 60 corresponding to the connection area L is removed. A part of the inner flexible board 20 is exposed in the connection area L. A part of the inner flexible board 20 corresponding to the first region F and a part of the outer rigid board 60 cooperatively form the first rigid board 11, and a part of the inner flexible board 20 corresponding to the second region S and a part of the outer rigid board 60 cooperatively form the second rigid board 12.

Figure 8:
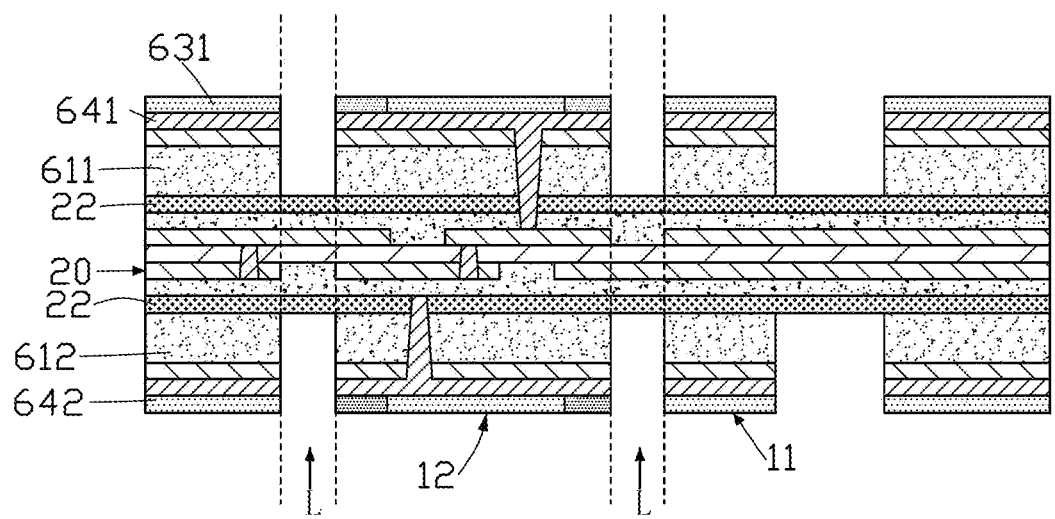
FIG. 8 is a diagrammatic view of the second intermediate body shown in FIG. 7 after a release film is removed.

In this embodiment, refer to FIGS. 7 and 8, step S13 includes the following steps:

S130: Refer to FIG. 7, the first soldering prevention layer 631, the first outer circuit layer 641, and the first base material layer 611 corresponding to the connection area L are laser-cut, and the second soldering prevention layer 632, the second outer circuit layer 642, and the second base material layer 612 corresponding to the connection area L are laser-cut.

S131: Refer to FIGS. 8 and 9, the release film 27 is peeled off to remove the first soldering prevention layer 631, the first outer circuit layer 641, and the first base layer 611 corresponding to the connection area L, and to remove the second soldering prevention layer 632, the second outer circuit layer 642, and the second base layer 612 corresponding to the connection area L.

S14: Refer to FIG. 10, the circuit board 1 is obtained by laser-cutting an exposed part of the inner flexible board 20 at the connection area L to form a plurality of flexible boards 13.

S2: Refer to FIG. 11, a photosensitive chip 2 is set on the second rigid board 12, and the photosensitive chip 2 is electrically connected to the second rigid board 12 through a metal wire M.

S3: Refer to FIG. 12, the second rigid board 12 is placed in the magnetic member 3, and the coils 14 are corresponding to the magnets 32 respectively, to obtain the anti-shake assembly 10.

Referring to FIG. 13, in this embodiment, a camera module 500 is also provided. The camera module 500 includes a lens assembly 501, a filter 502, and the anti-shake assembly 10. A through hole 313 is formed through the central plate 311, and the filter 502 is disposed on the through hole 313. The lens assembly 501 is disposed on the central plate 311 and faces the through hole 313, and the photosensitive chip 2 is also facing the through hole 313.

Figure 14:
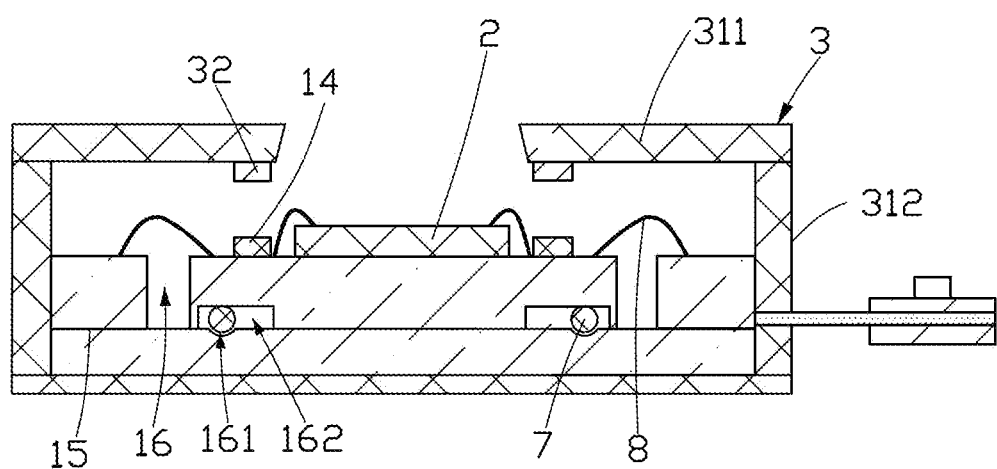
FIG. 14 is a diagrammatic view of an anti-shake assembly according to a second embodiment of the present application.

Referring to FIG. 14, in the second embodiment of the present disclosure, an anti-shake assembly 50 is provided, which is different from the first rigid board 11 of the anti-shake assembly 10. The anti-shake assembly 50 includes a third rigid board 15. The third rigid board 15 is provided with a second accommodating space 16. The second accommodating space 16 is not through the third rigid board 15, and the second rigid board 12 can be disposed in the second accommodating space 16 in a movable manner. The second rigid board 12 is flexibly connected to the third rigid board 15 through a connecting wire 8.

Referring to FIG. 14, in this embodiment, different from the balls 7 being disposed between the reinforcing plate 6 and the second rigid board 12 in the anti-shake assembly 10, in the anti-shake assembly 50, the balls 7 are disposed in the second accommodating space 16, and the second rigid board 12 is disposed on the balls 7.

Referring to FIG. 14, the bottom of the second accommodating space 16 is recessed to form a plurality of second receptacles 161. The second receptacles 161 are roughly hemispherical, and a portion of each ball 7 can be accommodatively disposed in the second receptacles 161 in a rolling manner, and the second rigid board 12 is configured over the balls 7. one portion of the balls 7 are confined to roll within the second receptacles 161. The second rigid board 12 facing one side of the balls 7 is recessed to form a first limit slot 162, while the other portion of each ball 7 can be movably accommodated in the first limit slot 162. The second receptacles 161 and the first limit slot 162 together confine rolling direction of the balls 7.

Figure 15:
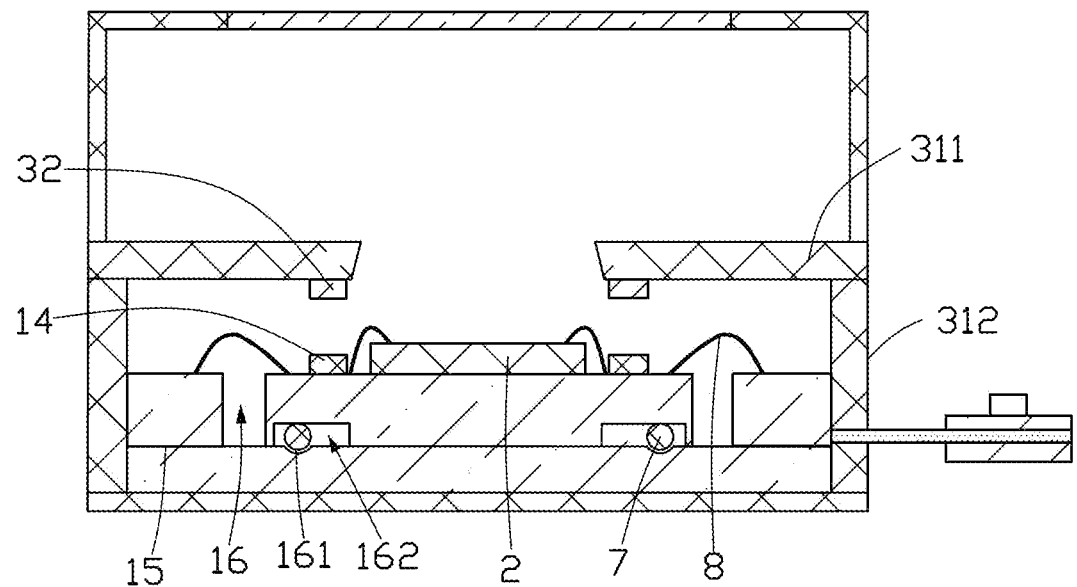
FIG. 15 is a diagrammatic view of a camera module of the second embodiment of the present application.

Referring to FIG. 15, a camera module 600 is also provided in the second embodiment of the present disclosure, which includes a lens assembly 501, a filter 502, and the anti-shake assembly 50 arranged in sequence. The central plate 311 has a through hole 313, and the filter 502 is covered on the through hole 313. The lens assembly 501 is set on the central plate 311 and faces the through hole 313, and the photosensitive chip 2 faces the through hole 313.

Figure 16:
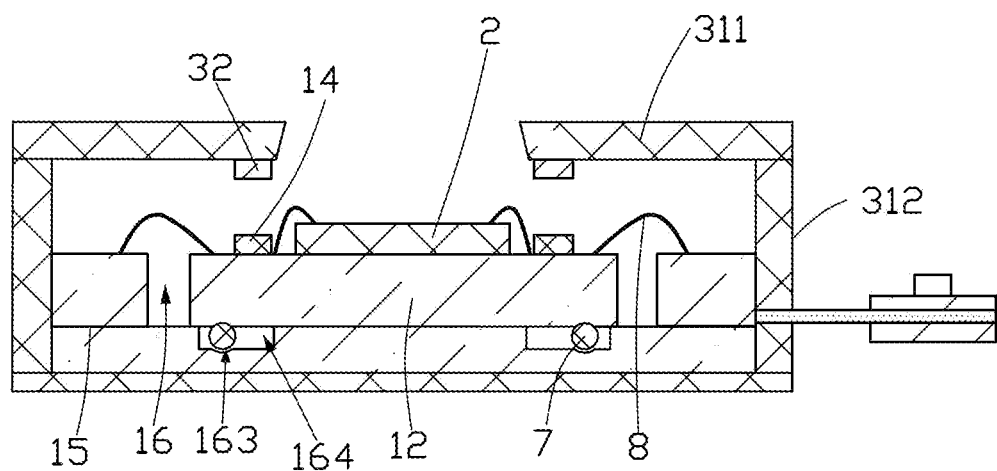
FIG. 16 is a diagrammatic view of an anti-shake assembly according to a third embodiment of the present application.

Referring to FIG. 16, in the third embodiment of the present disclosure, the difference from the second embodiment is that one side of the second rigid board 12 facing the ball 7 is recessed to form a plurality of third receptacles 163, the third receptacles 163 are roughly hemispherical, and a portion of each ball 7 can be rolled and accommodated in the third receptacles 163, the bottom of the second accommodating space 16 is concave to form a second limit slot 164, and another portion of each ball 7 can be movably accommodated in the second limit slot 164, the second limit slot 164 is used to limit the movement range of the second rigid board 12 in the second accommodating space 16.

Figure 17:
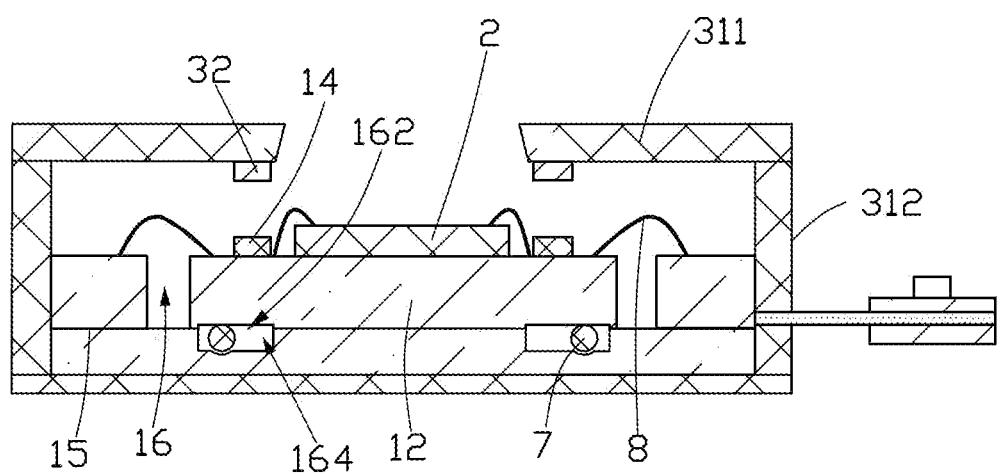
FIG. 17 is a diagrammatic view of an anti-shake assembly according to a fourth embodiment of the present application.

Referring to FIG. 17, in the fourth embodiment of the present disclosure, the difference from the second embodiment is that the second rigid board 12 is recessed to form a first limit groove 165, the bottom of the second accommodation space 16 is recessed to form the second limit groove 164, at least a part of the first limit groove 165 and the second limit groove 164 are oppositely arranged, a part of the ball 7 is accommodated in the first limit groove 165, and the other part of the ball is accommodated in the second limit groove 164.

Figure 20:
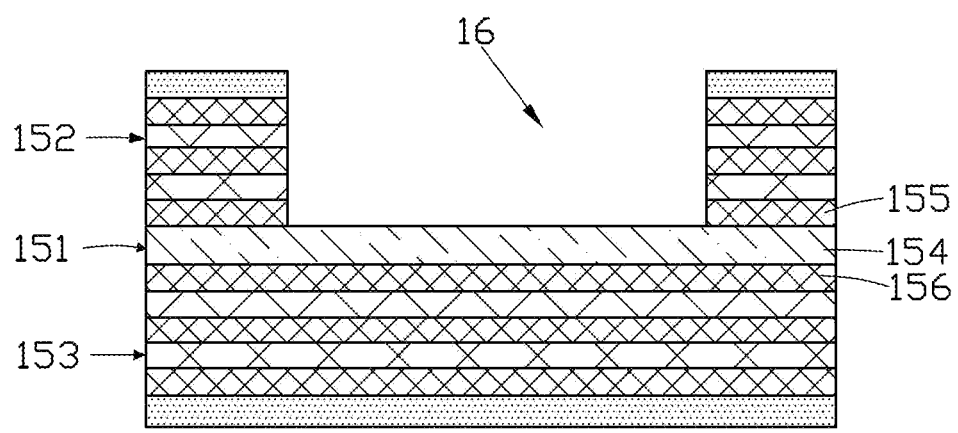
FIG. 20 is a diagrammatic view of a third rigid board of the second embodiment of the present application.

Refer to FIGS. 18 to 24, the second embodiment of the present disclosure also provides a method for manufacturing the described anti-shake assembly 50, including steps:

S4: Referring to FIG. 20, a third rigid board 15 is provided, which includes an inner base plate 151, a first outer base plate 152, and a second outer base plate 153. The first outer base plate 152 and the second outer base plate 153 are set on opposite sides of the inner base plate 151. The inner base plate 151 includes a dielectric layer 154, a first inner conductor layer 155, and a second inner conductor layer 156, with the first inner conductor layer 155 and the second inner conductor layer 156 set on opposite sides of the dielectric layer 154. The third rigid board 15 has the second accommodating space 16, which passes through the first outer base plate 152 and the first inner conductor layer 155, with the dielectric layer 154 exposed at the bottom of the second accommodating space 16.

Figure 18:
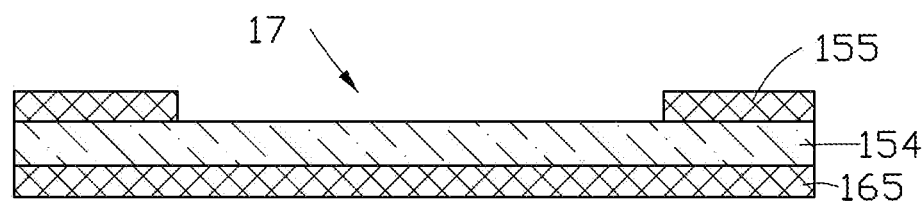
FIG. 18 is a diagrammatic view of an inner base plate in the second embodiment of the present application.
Figure 19:
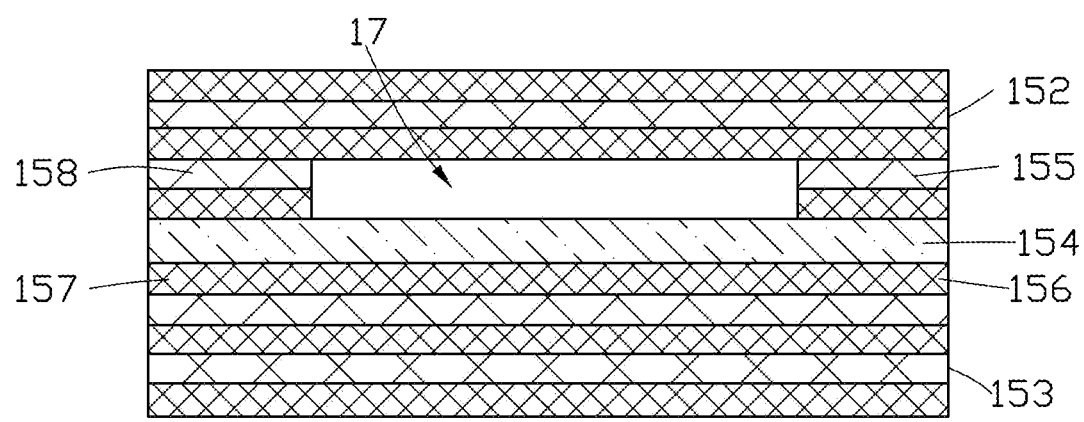
FIG. 19 is a diagrammatic view of the inner base plate shown in FIG. 18 with a first/second outer base plate set.

Referring to FIGS. 18 to 20, a manufacturing method of the third rigid board 15 in S4 including steps:

S40: Referring to FIG. 18, a first inner conductive layer 155 is provided on the inner base plate 151. An inner groove 17 is formed on the first inner conductive layer 155 and extends through the first inner conductive layer 155. The dielectric layer 154 is exposed at the bottom of the inner groove 17.

S41: Refer to FIG. 19, a third adhesive layer 158 is formed on the first inner conductive layer 155. The first outer base plate 152 is then bonded to the third adhesive layer 158. A fourth adhesive layer 157 is formed on the second inner conductive layer 156, and the second outer base plate 153 is bonded to the fourth adhesive layer 157.

S42: Referring to FIG. 20, a portion of the first outer base plate 152 corresponding to the inner groove 17 is removed by laser cutting to form the second accommodating space 16 and obtain the third rigid board 15.

Figure 21:
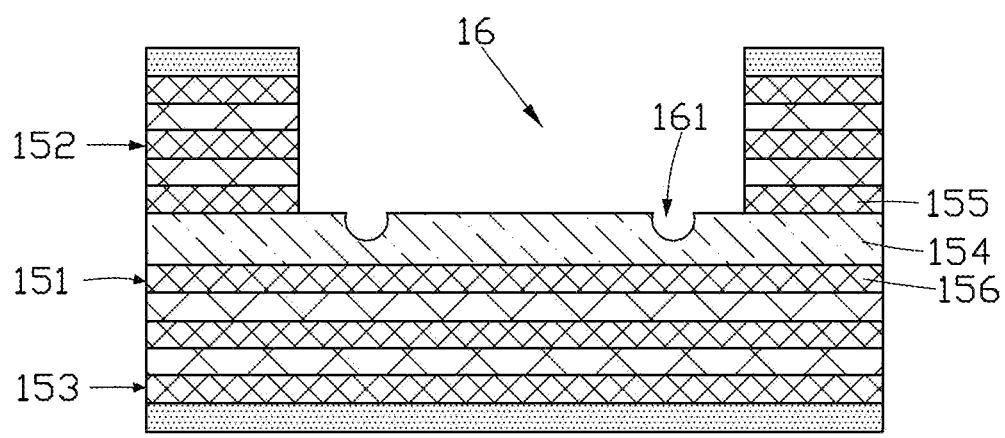
FIG. 21 is a diagrammatic view of the third rigid board shown in FIG. 20 with an outer circuit layer set.
Figure 22:
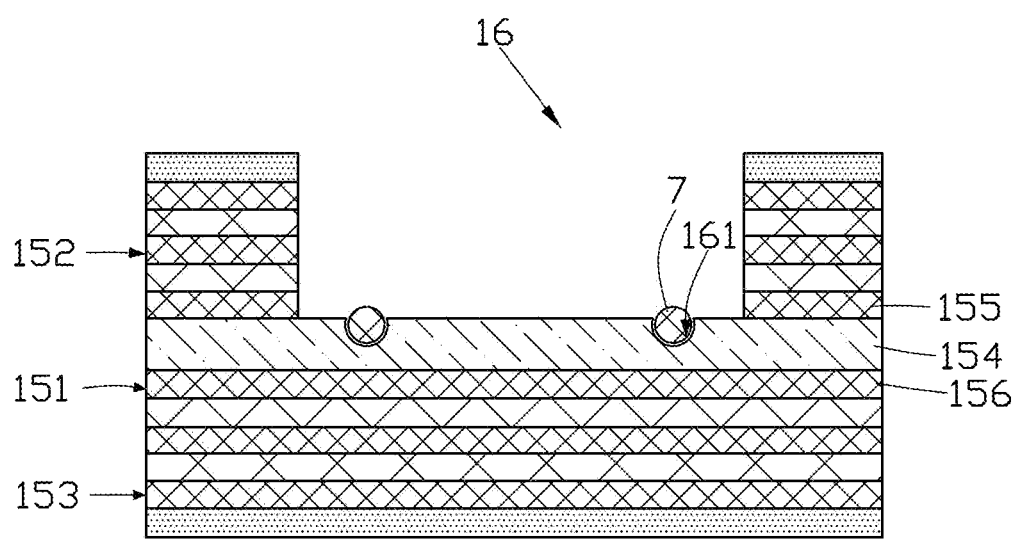
FIG. 22 is a diagrammatic view of the third rigid board shown in FIG. 21 with a ball set.

S5: Referring to FIGS. 21 and 22, the second receptacles 161 are formed on the exposed portion of the dielectric layer 154 at the bottom of the second accommodating space 16 by mechanical drilling, and the balls 7 are set in the second receptacles 161.

Figure 23:
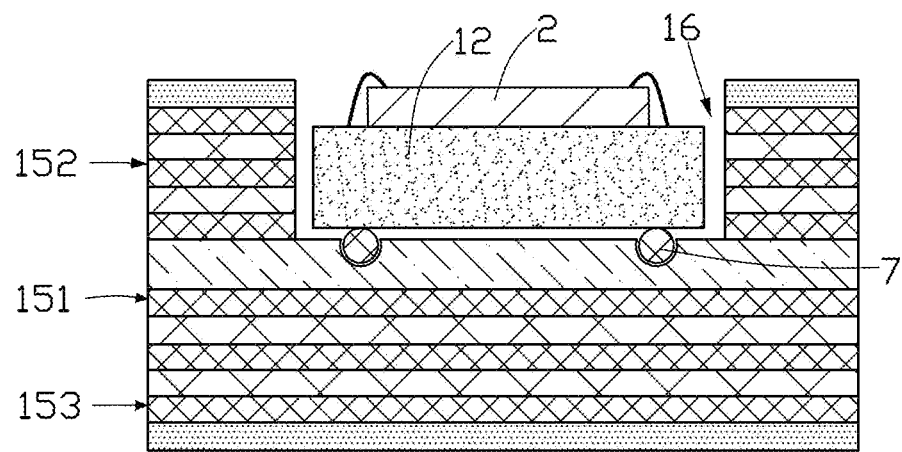
FIG. 23 is a diagrammatic view of the third rigid board shown in FIG. 22 with a second rigid board set.
Figure 24:
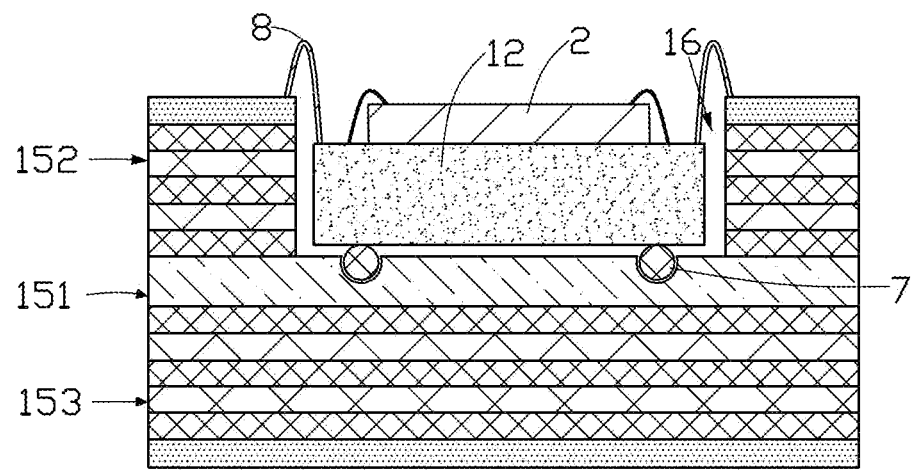
FIG. 24 is a diagrammatic view of the third rigid board shown in FIG. 23 connected with the second rigid board with flexible connecting wires.

S6: Referring to FIGS. 23 and 24, the second rigid board 12 is set on the balls 7, and the third rigid board 15 and the second rigid board 12 are electrically connected through the connecting wire 8.

S7: Referring to FIG. 14, the second rigid board 12 and the third rigid board 15 are accommodated in the magnetic member 3, and the coils 14 correspond to the magnet 32 to obtain the anti-shake assembly 50.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An anti-shake assembly comprising:
   a circuit board;
   a photosensitive chip connected to the circuit board; and
   a magnetic member;
   wherein the circuit board comprises a first rigid board, a second rigid board, a plurality of flexible connectors, and a plurality of coils, the first rigid board defines an accommodating space, the second rigid board is movably disposed within the first accommodating space, the plurality of flexible connectors is connected between the second rigid board and the first rigid board, the photosensitive chip and the plurality of coils are disposed on the second rigid board, and
   wherein the magnetic member comprises a central plate, a side plate, and a plurality of magnets, the side plate is connected to the central plate to form a receiving space, the plurality of magnets is disposed on one side of the central plate facing the receiving space, the plurality of magnets interacts with the plurality of coils to generate Lorentz forces;
   wherein the anti-shake assembly further comprises a gyroscope and a control chip, the gyroscope is arranged on the second rigid board, the control chip is arranged on the first rigid board or the second rigid board, the gyroscope is electrically connected to the control chip, and the control chip is electrically connected to the coil, the gyroscope senses posture information of the photosensitive chip, and the control chip controls an energization state of the coils based on the posture information of the photosensitive chip.

2. The anti-shake assembly of claim 1, further comprising a reinforcing plate and a plurality of balls, wherein the accommodating space extends through the first rigid board, the reinforcing plate is spaced apart from one side of the first rigid board opposite to the photosensitive chip, the plurality of balls is rollably arranged between the reinforcing plate and the second rigid board.

3. The anti-shake assembly of claim 2, wherein the reinforcing plate defines a plurality of first receptacles, the plurality of balls is confined to roll within the plurality of first receptacles.

4. The anti-shake assembly of claim 1, further comprising a plurality of balls, wherein the accommodating space partially extends through the first rigid board, the plurality of balls is disposed between a bottom of the accommodating space and the second rigid board.

5. The anti-shake assembly of claim 4, wherein the bottom of the accommodating space is recessed inward to form a plurality of second receptacles, the plurality of balls is confined to roll within the plurality of the plurality of second receptacles.

6. The anti-shake assembly of claim 5, wherein one side of the second rigid board is recessed inward to from a first limit slot, the plurality of balls is confined to roll within the first limit slot.

7. The anti-shake assembly of claim 1, wherein the flexible connector comprises a plurality of flexible boards or a plurality of connecting wires.

8. The anti-shake assembly of claim 1, wherein the photosensitive chip is disposed on a center of the second rigid board, the plurality of coils surrounds the photosensitive chip.

9. A manufacturing method of anti-shake assembly comprising:
providing a circuit board, wherein the circuit board comprises a first rigid board, a second rigid board, a plurality of connectors, and a plurality of coils, the first rigid board defines an accommodating space, the second rigid board being accommodated in the accommodating space, the connectors being flexibly connected between the first rigid board and the second rigid board, the coils being arranged on the second rigid board;
setting a photosensitive chip on the second rigid board; and
setting a magnetic member on the circuit board, the magnetic member a central plate, a side plate, and a plurality of magnets, the side plate is connected to the central plate to form a receiving space, the plurality of magnets is disposed on one side of the central plate facing the receiving space, the plurality of magnets is used for interacting with the plurality of charged coils to generate Lorentz force;
wherein the manufacturing method of the circuit board comprising:
providing an inner flexible board, wherein the inner flexible board comprises a core board and cover films disposed on opposite sides of the core board, the core board comprises an insulating layer and inner circuit layers disposed on opposite sides of the insulating layer, the cover films comprises an adhesive layer and a cover layer, and the adhesive layer is disposed between the inner circuit layers and the cover layer, along the thickness direction of the inner flexible board, the inner flexible board is divided into a first area, a second area, and a connecting area, the first area is disposed around the second area, and the connecting area connects the first area and the second area;
placing an outer rigid board on the inner flexible board, wherein the outer rigid board comprises a substrate layer, an outer circuit layer, a plurality of the coils, and a soldering prevention layer, the substrate layer is disposed between the outer circuit layer and the cover layer, the plurality of coils are disposed on one side of the outer circuit layer away from the substrate layer, and the soldering prevention layer covers the outer circuit layer;
removing a corresponding part of the outer rigid board in the connection area, a corresponding part of the inner flexible board in the first region and a part of the outer rigid board form the first rigid board, and a corresponding part of the inner flexible board in the second region and a part of the outer rigid board form the second rigid board; and
cutting an exposed part of the inner flexible board at the connection area to form a plurality of flexible connectors.

10. The manufacturing method of claim 9, further comprising:
setting a release film on the cover films corresponding to the connection area; and
peeling off the release film to remove the outer rigid board corresponding to the connection area.

11. A camera module comprising:
a lens assembly;
a filter; and
an anti-shake assembly comprises:
a circuit board;
a photosensitive chip connected to the circuit board; and
a magnetic member;
wherein the circuit board comprises a first rigid board, a second rigid board, a plurality of flexible connectors, and a plurality of coils, the first rigid board defines a accommodating space, the second rigid board is movably disposed within the first accommodating space, the plurality of flexible connectors is connected between the second rigid board and the first rigid board, the photosensitive chip and the plurality of coils are disposed on the second rigid board;
wherein the magnetic member comprises a central plate, a side plate, and a plurality of magnets, the side plate is connected to the central plate to form a receiving space, the plurality of magnets is disposed on one side of the central plate facing the receiving space, the plurality of magnets is used for interacts with the plurality of coils to generate Lorentz force;
wherein the central plate defines a through hole, the filter is disposed on the through hole, the lens assembly is disposed on the central plate and faces the through hole, and the photosensitive chip is also facing the through hole;
wherein the anti-shake assembly further comprises a gyroscope and a control chip, wherein the gyroscope is arranged on the second rigid board, the control chip is arranged on the first rigid board or the second rigid board, the gyroscope is electrically connected to the control chip, and the control chip is electrically connected to the coil, the gyroscope is used for sensing a posture information of the photosensitive chip, and the control chip is used for controlling a energization state of the coils based on the posture information.

12. The camera module of claim 11, wherein the anti-shake assembly further comprises a reinforcing plate and a plurality of balls, wherein the accommodating space extends through the first rigid board, the reinforcing plate is spaced apart from one side of the first rigid board opposite to the photosensitive chip, the plurality of balls is rollably arranged between the reinforcing plate and the second rigid board.

13. The camera module of claim 12, wherein the reinforcing plate defines a plurality of first receptacles, the plurality of balls is confined to roll within the plurality of first receptacles.

14. The camera module of claim 11, wherein the anti-shake assembly further comprises a plurality of balls, the accommodating space partially extends through the first rigid board, the plurality of balls is disposed between a bottom of the accommodating space and the second rigid board.

15. The camera module of claim 14, wherein the bottom of the accommodating space is recessed inward to form a plurality of second receptacles, the plurality of balls is confined to roll within the plurality of the plurality of second receptacles.

16. The camera module of claim 15, wherein the one side of the second rigid board is recessed inward to from a first limit slot, the plurality of balls is confined to roll within the first limit slot.

17. The camera module of claim 11, wherein the flexible connector comprises a plurality of flexible boards or a plurality of connecting wires.

* * * * *